United States Patent
Ellefson

(10) Patent No.: US 9,259,913 B2
(45) Date of Patent: Feb. 16, 2016

(54) APPARATUS AND METHOD FOR ORIENTING A BEVERAGE CONTAINER END CLOSURE AND APPLYING INDICIA IN A PREDETERMINED LOCATION

(71) Applicant: Ball Corporation, Broomfield, CO (US)

(72) Inventor: Dean C. Ellefson, Arvada, CO (US)

(73) Assignee: Ball Corporation, Broomfield, CO (US)

( * ) Notice: Subject to any disclaimer, the term of this patent is extended or adjusted under 35 U.S.C. 154(b) by 0 days.

(21) Appl. No.: 14/332,618

(22) Filed: Jul. 16, 2014

(65) Prior Publication Data

US 2015/0027327 A1     Jan. 29, 2015

Related U.S. Application Data

(60) Provisional application No. 61/859,115, filed on Jul. 26, 2013.

(51) Int. Cl.
| | |
|---|---|
| *B41F 17/00* | (2006.01) |
| *B41F 17/28* | (2006.01) |
| *B65G 47/24* | (2006.01) |
| *B65G 47/244* | (2006.01) |
| *B21D 51/44* | (2006.01) |
| *B65D 17/00* | (2006.01) |

(52) U.S. Cl.
CPC ............ *B41F 17/28* (2013.01); *B41F 17/00* (2013.01); *B41F 17/006* (2013.01); *B65G 47/24* (2013.01); *B65G 47/244* (2013.01); *B21D 51/44* (2013.01); *B65D 17/165* (2013.01); *B65D 2203/00* (2013.01)

(58) Field of Classification Search
CPC ........ B41F 17/00; B41F 17/006; B41F 17/28; B65G 47/24; B65G 47/244; B65G 17/165; B65G 2203/00; B21D 51/38; B21D 51/383; B21D 51/44; G09F 23/0091
See application file for complete search history.

(56) References Cited

U.S. PATENT DOCUMENTS

| | | | |
|---|---|---|---|
| 1,257,710 | A | 2/1918 | Januchowsky |
| 1,878,541 | A | 9/1932 | Reinhold |
| 2,764,933 | A | 10/1956 | Hargrave |
| 4,016,968 | A | 4/1977 | Stelter |
| 4,203,240 | A | 5/1980 | Goodwin |
| 5,233,922 | A | 8/1993 | Stirbis |
| D365,021 | S | 12/1995 | Park |
| 5,492,077 | A | 2/1996 | Rose |

(Continued)

FOREIGN PATENT DOCUMENTS

| | | |
|---|---|---|
| GB | 2428659 | 2/2007 |
| GB | 2428668 | 2/2007 |

(Continued)

OTHER PUBLICATIONS

Catalog titled "Powerbuilt Hand & Specialty Tools" by Powerbuilt, published Jul. 2011.*

(Continued)

*Primary Examiner* — Blake A Tankersley
(74) *Attorney, Agent, or Firm* — Sheridan Ross P.C.

(57) ABSTRACT

An apparatus and method of orienting and decorating container end closures is provided. More specifically, the present invention relates to apparatus and methods used to position container end closures in a predetermined orientation and then decorate a predetermined portion of the end closures.

16 Claims, 6 Drawing Sheets

(56) References Cited

U.S. PATENT DOCUMENTS

| | | | |
|---|---|---|---|
| D379,065 S | 5/1997 | Dotson | |
| 5,893,286 A | 4/1999 | Johnson et al. | |
| 5,992,892 A | 11/1999 | Schaefer et al. | |
| 6,053,349 A | 4/2000 | Griggs, Jr. et al. | |
| 6,105,806 A | 8/2000 | Stasiuk | |
| 6,244,456 B1 | 6/2001 | Hanlon | |
| 6,382,440 B1 | 5/2002 | Brant et al. | |
| 6,524,048 B1* | 2/2003 | Tsukada et al. | 413/66 |
| 6,634,516 B2 | 10/2003 | Carballido | |
| 6,659,833 B1 | 12/2003 | Sloot | |
| 6,706,995 B2 | 3/2004 | Yamazawa et al. | |
| 6,808,351 B1 | 10/2004 | Brown et al. | |
| 6,868,627 B2 | 3/2005 | Elias | |
| 6,877,607 B2 | 4/2005 | Jenkins | |
| 7,108,469 B2 | 9/2006 | Jenkins | |
| 7,914,640 B2 | 3/2011 | Ronnberg | |
| 2003/0192211 A1 | 10/2003 | Elias | |
| 2004/0123444 A1* | 7/2004 | Lee | 29/458 |
| 2005/0045637 A1 | 3/2005 | Rohr et al. | |
| 2005/0082299 A1 | 4/2005 | Jenkins | |
| 2006/0140746 A1 | 6/2006 | Koon | |
| 2008/0110888 A1 | 5/2008 | Turner et al. | |
| 2010/0058896 A1* | 3/2010 | Abel et al. | 81/60 |
| 2011/0050346 A1 | 3/2011 | Schroth et al. | |
| 2011/0084051 A1 | 4/2011 | Reed et al. | |
| 2011/0100854 A1 | 5/2011 | Chapin | |
| 2011/0115815 A1 | 5/2011 | Xu et al. | |
| 2011/0226636 A1 | 9/2011 | Petti | |
| 2011/0226719 A1* | 9/2011 | Park | 215/10 |
| 2012/0137837 A1* | 6/2012 | Souma | 81/124.3 |
| 2013/0075296 A1 | 3/2013 | Ramsey et al. | |

FOREIGN PATENT DOCUMENTS

| | | |
|---|---|---|
| WO | WO 99/09853 | 3/1999 |
| WO | WO 00/47487 | 8/2000 |
| WO | WO 2007/007102 | 1/2007 |
| WO | WO 2011/050346 | 4/2011 |
| WO | WO 2011/115815 | 9/2011 |
| WO | WO 2013/049313 | 4/2013 |
| WO | WO 2013/049320 | 4/2013 |
| WO | WO 2014/008544 | 1/2014 |
| WO | WO 2014/072455 | 5/2014 |

OTHER PUBLICATIONS

International Search Report and Written Opinion for International (PCT) Patent Application No. PCT/US2014/046868, mailed Jan. 2, 2015, 10 pages.

"Crona Treatment," Wikipedia, last modified Feb. 7, 2014, 4 pages [retrieved from: http://en.wikipedia.org/w/index.php?title=Corona_treatment&oldid=594301353].

U.S. Appl. No. 14/301,018, filed Jun. 10, 2014, Carreras.

"How Ball Makes Beverage Ends," Ball, last modified Dec. 5, 2013, 1 page [retrieved from: http://www.ball.com/images/ball_com/product_options_files/How_Ball_Makes_Beverage_Ends.pdf].

"UV LED Curing," Wikipedia, last modified May 24, 2014, 3 pages [retrieved from http://en.wikipedia.org/w/index.php?title=UV_LED_Curing&oldid=609977029].

* cited by examiner

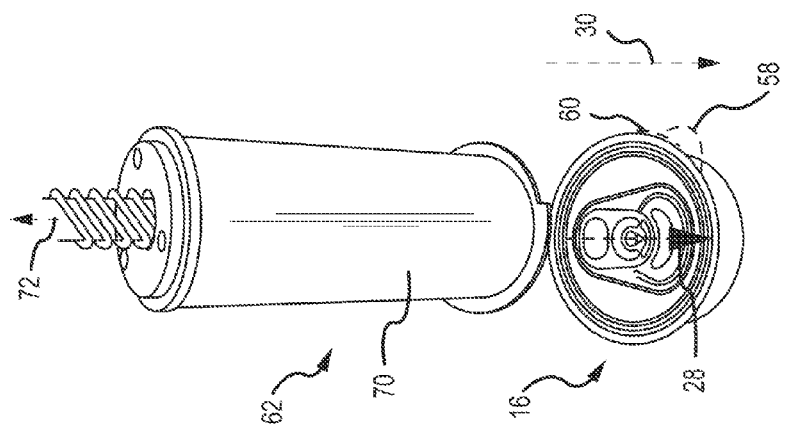
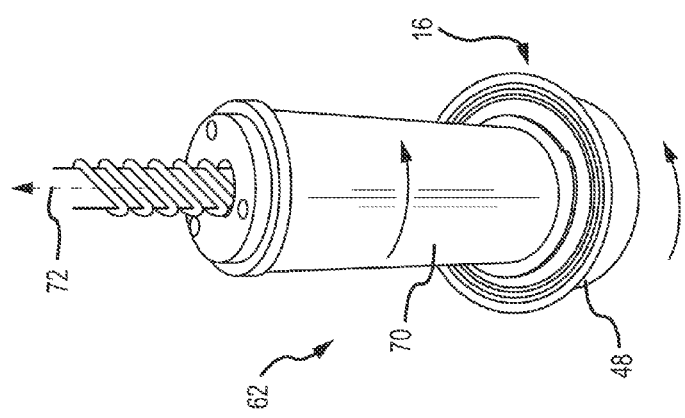
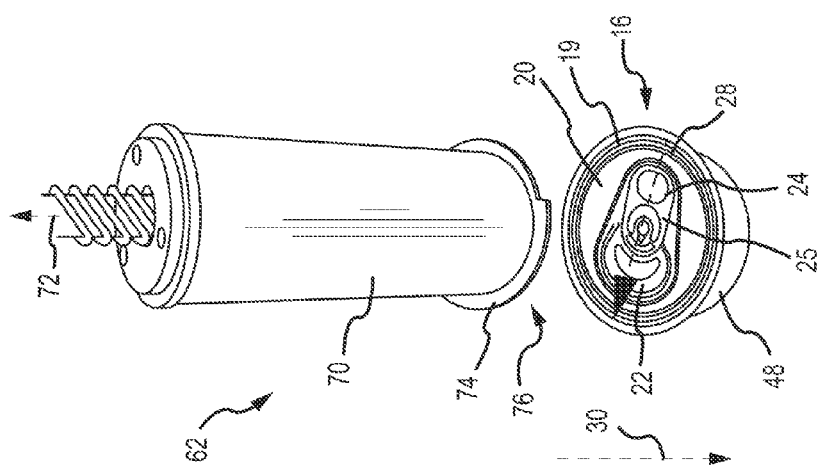

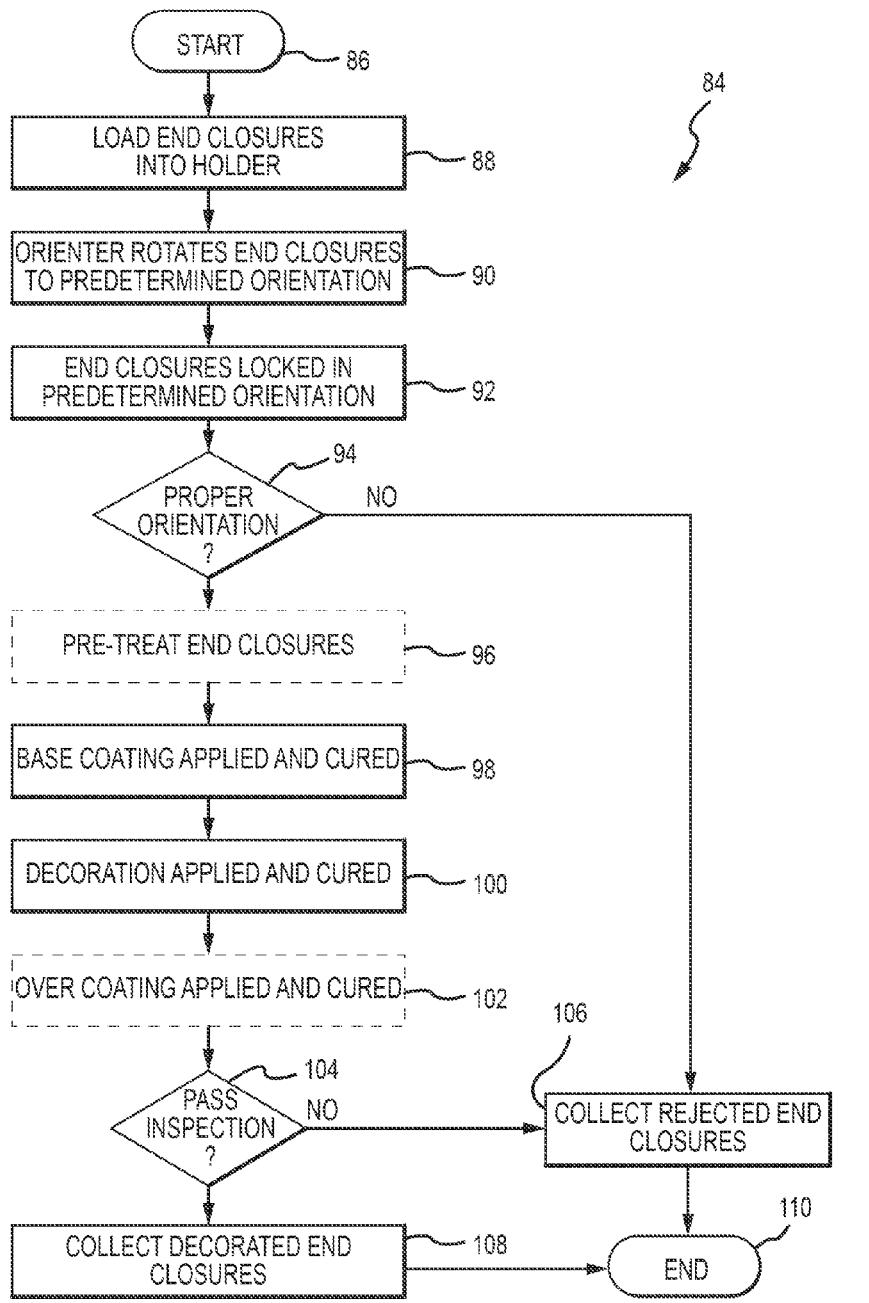

APPARATUS AND METHOD FOR ORIENTING A BEVERAGE CONTAINER END CLOSURE AND APPLYING INDICIA IN A PREDETERMINED LOCATION

CROSS-REFERENCE TO RELATED PUBLICATIONS

This application claims priority under 35 U.S.C. §119(e) to U.S. Provisional Application Ser. No. 61/859,115 filed Jul. 26, 2013, which is incorporated herein in its entirety by reference.

FIELD OF THE INVENTION

The present invention relates generally to the manufacture of container end closures. More specifically, the present invention relates to methods and apparatus for orienting and registering a plurality of container end closures at high speed and providing printed indicia on predetermined portions of each end closure.

BACKGROUND

The global beverage industry, including soft drinks, beers, ciders, spirits and wines, was valued at $1.4 trillion in 2008. The industry includes roughly 1,500 soft drink brands and about 20,000 beer brands. Many of these brands package their beverages in metallic beverage containers. As a result, approximately 80 billion metallic beverage containers are used every year globally.

Metallic beverage containers offer bottlers, distributors, and retailers an ability to stand out at the point of sale because metal beverage containers provide ideal surfaces to decorate with brand names, logos, designs, product information, and/or other preferred indicia for identifying, marketing, and distinguishing the beverage container and its contents from other products and competitors. Currently the container body is the primary surface of a beverage container that is decorated. However, container bodies and the decorations thereon are frequently obstructed during consumption of a beverage by the consumer's hand. Further, the alignment between decorations on the container body and the pour opening of the container end closure is random and therefore the decoration may be positioned away from the consumer during consumption.

Metal end closures provide a unique and effective surface for decorating with advertising and marketing indicia in new and creative ways. Unlike the container body, consumers naturally align the end closure to open and drink from the container. Thus, the end closure is positioned to be viewed by the consumer. Further, the end closure is typically not obstructed or blocked during consumption of the beverage. However, end closures are frequently left undecorated because there are several disadvantages with the known methods of decorating them. Therefore, container end closures provide an underutilized opportunity for differentiating products at the point of sale and for attracting consumers.

Container end closures, or shells, are formed separately from the container body. The manufacture of end closures requires a number of processing steps collectively referred to as a conversion process and is generally illustrated and described in "How Ball Makes Beverage Ends," available at http://www.ball.com/images/ball_com/product_options_files/How_Ball_Makes_Beverage_Ends. pdf (last visited Jun. 13, 2014), which is incorporated herein by reference in its entirety. During the conversion process, the end closures are transported to a number of processing stations. Typically, a shell press punches out circular blanks from a roll or coil of a metal material and forms the blanks into shells. A curler forms a peripheral curl around a circumference of the shells and forms a countersink in the shells. Liners apply sealing compounds to the shells. A conversion press then converts the shells into end closures. The orientation of the shells entering the conversion press is random because there is no need, or reliable method, for orienting the shells in the current conversion process. The conversion press contains multiple progressive die sets which raise a rivet in the center of the shell, forms severable scores to define a tear panel and a pour opening, and connects a pull tab to the rivet. The end closures are then bagged, palletized, and stored until needed to seal a filled container body.

Current manufacturing methods limit the types and locations of decorations that can be applied to the end closures. One known method of decorating end closures applies the decoration to the metal stock material before forming the shells. Examples of this method are described in WIPO Publication Number WO 2007/007102, UK Patent No. 2,428,659, UK Patent No. 2,428,668 which are incorporated herein by reference in their entireties. Although both coils and cut sheets of metal stock material can be decorated before the shells are formed in the conversion process, indexing and printing decorations on coils and cut sheets is complicated and cost prohibitive. In addition, there is a high probability of damaging the decoration when the stock material is used to form the end closures in the conversion process. For example, if the decoration is not properly registered with the shell press a portion of the decoration may be cut off. The decoration may also be intersected and damaged by scores or positioned in an area obstructed from view by the pull tab. Additionally, the decoration can be damaged by tools used in the conversion process.

Another known method of decorating end closures involves decorating the shells before the shells enter the conversion press. However, because shells are not oriented when they enter the conversion press, the decoration can be intersected by scores, positioned beneath the pull tab, or located partially on the tear panel. As a result, the decoration may be hidden from view by the tab or damaged when the tear panel is opened.

Methods of decorating converted end closures after the tear panel is formed and the pull tab is attached to the central panel are also known. One such method uses an optical means of orienting converted end closures prior to decorating the end closures. However, the known methods of decorating converted end closures are generally slow and/or do not apply decorations in predetermined areas of the end closure because the end closures are not oriented before the decoration is applied.

Due to the numerous limitations associated with the existing process of manufacturing and decorating end closures, there exists an unmet need for an economical, fast, and reliable method and apparatus for orienting post-conversion end closures to enable the application of decorations and other preferred indicia to specific areas of the end closures.

SUMMARY OF THE INVENTION

The present invention provides methods and apparatus for orienting end closures relative to a reference axis in a cost-effective, fast, and reliable manner. After the end closures are oriented, the end closures may be decorated at specific areas that are not obstructed or interrupted by the pull tab or scored portions of the end closure. One aspect of the present invention is to provide methods and devices for maintaining the desired orientation of the oriented end closures to ensure that decorations are applied to specific areas of the end closures. Another aspect of the present invention is to provide an improved, economical and reliable method for applying decorations to the oriented, post-conversion end closures.

In accordance with one aspect of the present invention, a novel method of orienting and decorating an exterior surface of an end closure for a beverage container is provided. This includes, but is not limited to, a method generally comprising: (1) providing an end closure comprising a peripheral curl, a chuck wall extending downwardly from the peripheral curl, a countersink interconnected to a lower end of the chuck wall, a central panel interconnected to the countersink, a tear panel in the central panel, and a pull tab operably interconnected to an exterior surface the central panel; (2) placing an orientation head in rotational contact with an exterior surface of the end closure; (3) rotating the orientation head and the end closure to a predetermined orientation; (4) securing the end closure in the predetermined orientation; (5) disengaging the orientation head from the end closure; and (6) decorating a predetermined portion of the exterior surface of the end closure with an image.

Additionally, the method may further comprise: (7) placing the end closure on a die cap, the die cap operable to selectively prevent rotation and movement of the end closure; (8) forming a recess in one or more printing blankets, wherein the recess is adapted to receive the tab; (9) removably affixing the printing blankets onto a drum of a coater; (10) applying a base coat material to a predetermined portion of the printing blankets; (11) transferring the base coat material from the printing blankets to the predetermined portion of the exterior surface of the end closure.

The method may further include: (12) forming a recess in one or more printing blankets, wherein the recess is adapted to receive the tab; (13) removably affixing the printing blankets onto a drum of a printer; (14) forming the image on a print head; (15) applying ink to the image; (16) transferring the ink from the print head to a predetermined portion of the printing blankets; (17) transferring the ink from the printing blankets to the predetermined portion of the exterior surface of the end closure; and (18) curing the image with ultra violet light. In one embodiment, the print head comprises six print heads, and wherein each print head receives a different color or type of ink. In another embodiment, the printing blankets are removably affixed in from 1 to 10 rows to a circumference of the drum of the printer, and from 1 to 10 end closures are decorated simultaneously. In still another embodiment, decorating the predetermined portion of the exterior surface of the end closure comprises decorating a predetermined portion of at least one the central panel, the tear panel, and the pull tab.

In one embodiment, rotating the end closure to the predetermined orientation further comprises rotating the end closure until a Y-axis of the end closure is substantially parallel to a reference axis. In another embodiment, an angle between the Y-axis and the reference axis is less than about 5°. In still another embodiment, the orientation head comprises a body portion, a face portion, a pocket formed in the face portion to receive the pull tab of the end closure, a tapered portion extending from the face portion to a bottom of the pocket, and a wall extending from the bottom of the pocket substantially vertically to the face portion, wherein when the orientation head is rotated the pull tab slides into the pocket and is retained in the pocket by the wall.

In accordance with another aspect of the present invention, an apparatus for orienting and decorating an exterior surface of an end closure which is adapted for interconnection to a neck of a beverage container is disclosed, the apparatus operable to simultaneously orient and decorate multiple end closures. The apparatus generally comprises: (1) a balancer operable to receive the end closure and place the end closure in a holder, the holder operable to move the end closure through the apparatus and selectively prevent rotation of the end closure; (2) an orientor, the orientor operable to receive the holder and rotate the end closure to a predetermined orientation, wherein the holder prevents rotation of the end closure from the predetermined orientation; (3) a coater operable to apply a base coat material to a predetermined portion of the exterior surface of the end closure; (4) a printer operable to transfer an image to the predetermined portion of the end closure; and (5) at least one curer operable to cure the base coat material and the image.

In one embodiment, the orientor includes an orientation head having a geometry adapted to locate and engage an exterior surface feature on the end closure. In one embodiment, the exterior surface feature is a pull tab interconnected to an exterior surface of the central panel. In another embodiment, the exterior surface feature is a tear panel of the central panel. In still another embodiment, the exterior surface feature is the central panel.

In another embodiment, the orientation head comprises a body portion, a face portion, a pocket formed in the face portion to receive the pull tab of the end closure, a tapered portion extending from the face portion to a bottom of the pocket, and a wall extending from the bottom of the pocket substantially vertically to the face portion, and wherein the orientation head is operable to rotate around a longitudinal axis of the body portion. In still another embodiment, the holder includes a clamp that applies pressure to the end closure to hold the end closure in the predetermined orientation. In yet another embodiment, the apparatus is operable to orient and decorate from 1 to 5 end closures simultaneously.

In one embodiment, the printer generally comprises, but is not limited to, (1) at least one print head with the image formed thereon; (2) an inker operable to transfer ink to the image on the print head; and (3) a drum, the drum having a circumference with one or more printing blankets affixed thereto, the printing blankets each having a recess adapted to receive a pull tab attached to the exterior surface of the end closure, the drum operable to move the printing blankets into rotational contact with the print head and the exterior surface of the end closure, wherein the image is transferred from the print head to the printing blankets and then to the predetermined portion of the end closure.

It is another aspect of the present invention to provide an orientation head for an orientor used to position an end closure in a decorating process. The orientation head generally comprises: (1) a body portion; (2) a face portion, the face portion oriented in a plane generally perpendicular with respect to a longitudinal axis of the body portion; and (3) a pocket formed in the face portion, the pocket having a size adapted to receive a pull tab of the end closure, the pocket having a bottom end substantially parallel to the face portion, a first side sloping upward from the bottom end to the face portion, and a second side forming a substantially vertical wall from the bottom end to the face portion. In one embodiment, the face portion is adapted to slide across an exterior surface of a pull tab interconnected to the end closure. In another embodiment, the first side is adapted to direct a pull tab interconnected to the end closure from the face portion into the pocket. In yet another embodiment, the wall is adapted to retain a pull tab interconnected to the end closure in the pocket and the wall applies a force to a side surface of the pull tab to rotate the end closure to a predetermined orientation.

The above-described embodiments, objectives, and configurations are neither complete nor exhaustive. As will be appreciated, other embodiments of the invention are possible using, alone or in combination, one or more of the features set forth above or described in detail below.

References made herein to "end closures," or "container end closures" should not necessarily be construed as limiting the present invention to a particular size, shape, or type of end closure. It will be recognized by one skilled in the art that the present invention may be used to orient and decoration end closures of any variety, size, or type, including end closures with one or more pour or vent openings or other areas or features.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

References made herein to "decoration" should not necessarily be construed as limiting the present invention to a particular type or method of printing, enchancing, or decorating end closures. Those of skill in the art will recognize that the present invention may be used with any variety of decorating processes, including lithography, offset printing, dry offset printing, gravure printing, intaglio printing, screen printing, tampo printing, inkjet printing, flexographic printing, and combinations thereof. Further, the term "decoration" as used herein refers to any indicia placed on the end closure for any purpose, including identifying the contents, location and date of manufacture, recommended use date, manufacturer of the container or container component, providing trade names, advertising, promotion, or the like. In addition, it will be understood that the term decoration may include the application of primers, coatings, and decorative inks of all types to the end closures.

References made herein to "lithographic printing" or aspects thereof should not necessarily be construed as limiting the present invention to a particular method or type of printing. It will be recognized by one skilled in the art that the present invention may be used in other printing processes such as offset printing, dry offset printing, gravure printing, intaglio printing, screen printing, and inkjet printing.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary of the Invention, Brief Description of the Drawings, Detailed Description, Abstract, and Claims themselves.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements or components. Additional aspects of the present invention will become more readily apparent from the Detailed Description, particularly when taken together with the drawings.

BRIEF DESCRIPTION OF DRAWINGS

The accompanying drawings, which are incorporated herein and constitute a part of the specification, illustrate embodiments of the invention and together with the Summary of the Invention given above and the Detailed Description of the drawings given below serve to explain the principles of these embodiments. In certain instances, details that are not necessary for an understanding of the disclosure or that render other details difficult to perceive may have been omitted. It should be understood, of course, that the invention is not necessarily limited to the particular embodiments illustrated herein. Additionally, it should be understood that the drawings are not necessarily to scale.

FIGS. 5A-5C depict a method of orienting an end closure with an orientation head according to one embodiment of the present invention; and FIG. 6 is a process diagram of a method of orienting and decorating end closures according to one embodiment of the present invention.

Figure 1:
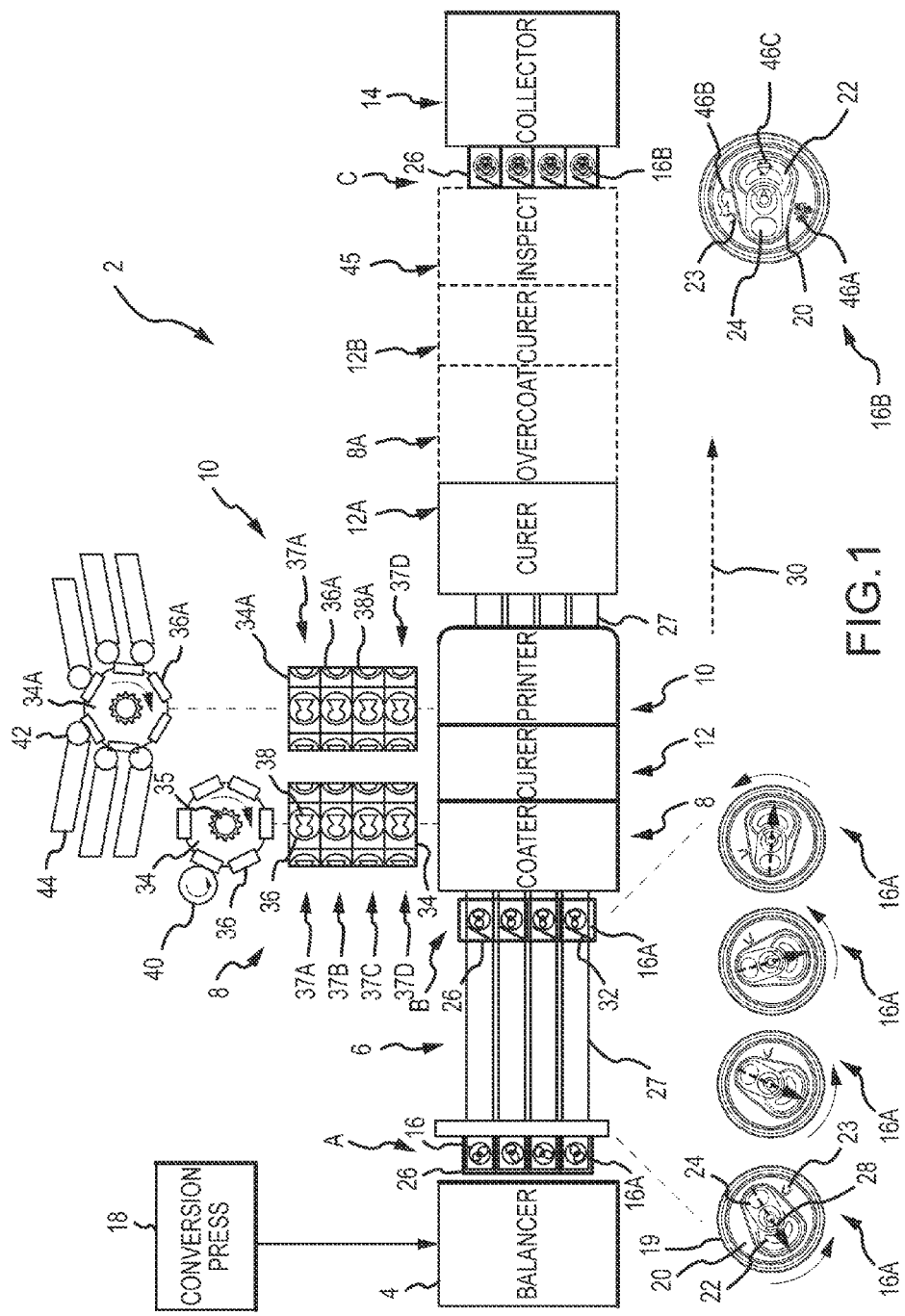
FIG. 1 is a schematic flow diagram of one embodiment of the present invention which depicts a system for orienting and decorating end closures.

Similar components and/or features may have the same reference number. Components of the same type may be distinguished by a letter following the reference number. If only the reference number is used, the description is applicable to any one of the similar components having the same reference number.

To assist in the understanding of one embodiment of the present invention the following list of components and associated numbering found in the drawings is provided herein:

| Number | Component |
|---|---|
| 2 | Orienting and decorating system |
| 4 | Balancer |
| 6 | Orientor |
| 8 | Coater |

-continued

| Number | Component |
|---|---|
| 10 | Printer |
| 12 | Curer |
| 14 | Collector |
| 16 | End closure |
| 18 | Conversion press |
| 19 | Peripheral curl |
| 20 | Central panel |
| 22 | Tear panel |
| 23 | Secondary vent panel |
| 24 | Pull tab |
| 25 | Pull tab side surface |
| 26 | Holder |
| 27 | Chain |
| 28 | Y-axis |
| 30 | Reference axis |
| 32 | Clamping mechanism |
| 34 | Drum |
| 35 | Gear |
| 36 | Printing blankets |
| 37 | Rows of blankets |
| 38 | Recess |
| 40 | Application roller |
| 42 | Print head |
| 44 | Inker |
| 45 | Inspection station |
| 46 | Image |
| 48 | Die cap |
| 50 | Body |
| 52 | Bore |
| 54 | Face |
| 56 | Aperture |
| 58 | Clamp |
| 60 | Clamp end |
| 62 | Orientation head |
| 64 | Chain |
| 66 | Wheels |
| 68 | Chain |
| 70 | Orientation head body |
| 72 | Longitudinal axis |
| 74 | Head |
| 76 | Face |
| 78 | Tapered portion |
| 80 | Pocket |
| 82 | Wall |
| 84 | Method of decorating and orienting end closures |
| 86 | Start |
| 88 | Load end closures |
| 90 | Rotate end closures |
| 92 | Lock end closures in predetermined orientation |
| 94 | Inspect for proper orientation |
| 96 | Pre-treat end closures |
| 98 | Apply and cure base coating |
| 100 | Decoration applied and cured |
| 102 | Optional over-coat applied and cured |
| 104 | Inspect end closures |
| 106 | Collect rejected end closures |
| 108 | Collect decorated end closures |
| 110 | End |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Referring now to FIG. 1, a system 2 for orienting and decorating end closures at a predetermined location is illustrated. The system generally includes a balancer 4, an orientor 6, a coater 8, a printer 10, a curer 12, and a collector 14.

The balancer 4, in one embodiment, receives converted end closures 16 from a conversion press 18. In one embodiment, the end closures 16 are transported from the conversion press 18 to the balancer 4 in a cylindrical stack (not illustrated). The cylindrical stack includes a rod with the end closures stacked along the axis of the rod. The end closures 16 generally include a peripheral curl 19, a central panel 20, a tear panel 22, and a pull tab 24 operably interconnected to an exterior surface of the end closure 16. Optionally, other features may be formed on the end closure, such a secondary vent panel 23. Each end closure 16 has a Y-axis 28 aligned with a diameter of the end closure and that generally divides each tab 24 into substantially symmetric halves.

The balancer 4, in one embodiment, is a mechanical sponge that controls the flow of the end closures 16 between the conversion press 18 and the system 2. The balancer 4 maintains the proper speed and flow of the end closures 16 to ensure a consistent, non-interrupted flow of end closures into the orientor 6. The balancer 4 accumulates end closures 16 from the conversion press 18 to ensure the system 2 is supplied with end closures 16 if the conversion press 18 or other upstream equipment goes offline, for example, for maintenance, during unscheduled stops, or when new coils of sheet metal are loaded in the uncoiler (not illustrated).

In one embodiment, the balancer 4 loads the end closures 16 into a flight or holder 26 with the pull tab 24 facing upward. The holders 26 stabilize and transport the end closures 16 through the system and provide support to the end closures 16 when the end closures are decorated and cured. When loaded into the holders 26 at point A, the end closures are unoriented with the tabs 24 and tear panels 22 of each end closure 16 randomly oriented with respect to the reference axis 30 of the system 2. Further, the Y-axis 28 of the end closures 16 may not be parallel to each other.

The holders 26 are interconnected to a belt or a chain 27 that forms a continuous loop that rotates through the system 2 from point A to point C. In one embodiment, two chains 27 form the continuous loop. Although only three holders 26 are illustrated, it should be understood by one skilled in the art that any number of holders 26 can be used with the system 2 of the present invention. The holders 26 are generally spaced at regular intervals along the chain 27 in the system 2. In one embodiment, the holders are comprised of two longitudinal rails connected by shorter lateral rungs. The rails and rungs form pockets in the holders 26 that are adapted to receive the end closures. The size of each holder 26 can be increased or decreased to hold end closures 16 of any size. The holders 26 are operable to allow the end closures 16 to rotate about a vertical axis when the holders 26 transport the end closures through the orientor 6. The vertical axis is substantially centered on the central panel 20 of the end closures and perpendicular to the Y-axis 28. In one embodiment, the holders 26 control the position of the end closures by contact with an inside surface of the central panel or by contact with an outside surface of a peripheral curl of the end closure.

Although the holders 26 illustrated in FIG. 1 are shown with four end closures 16, it will be appreciated by one of skill in the art that the holders 26 may be configured to transport fewer or more end closures. For example, in one embodiment, the system 2 is designed to orient and decorate one end closure 16 at a time and the holders 26 transport one end closure. In another embodiment, the system 2 is designed to orient and decorate two end closures simultaneously and the holders 26 transport two end closures. In still another embodiment, the holders 20 can transport five end closures 16 through the system 2. In yet another embodiment up to 12 end closures 16 are transported by each holder 26. The holders 26 transport the end closures 16 through the system 2 with a line drawn through a center of each end closure generally perpendicular to the reference axis 30 of the system 2.

Figure 2:
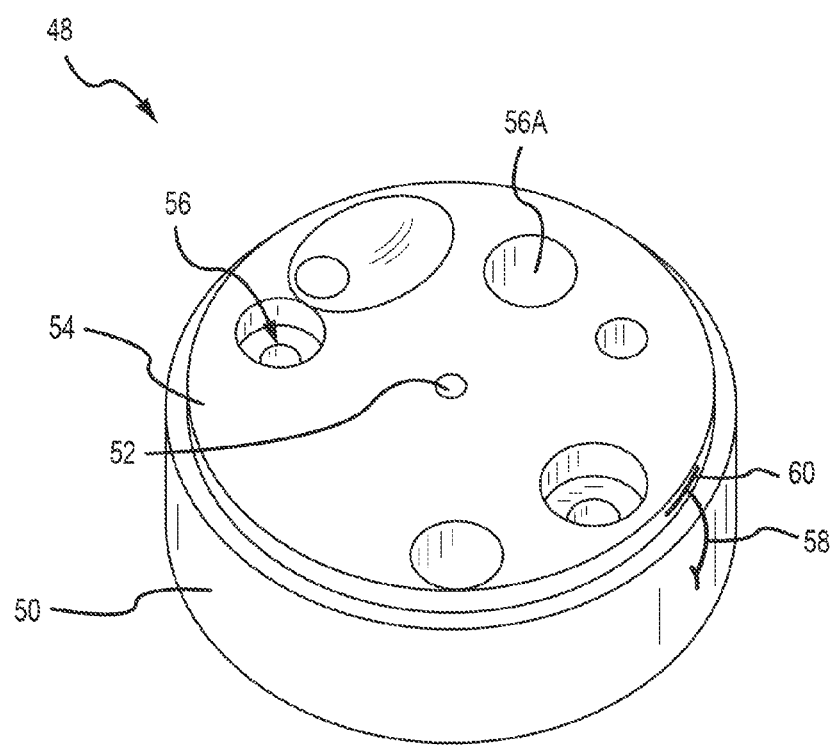
FIG. 2 is a perspective view of one embodiment of a die cap of the present invention which is adapted for holding an end closure.

Referring now to FIG. 2, the holders may include a die cap 48 adapted to receive each end closure 16. The die cap 48 has a generally cylindrical body 50 with a diameter approximately equal to an inside diameter of the end closures 16. One or more ridges, bumps, or protrusions may be formed on body 50 to frictionally engage the inside surface of the end closures. Optionally, the bumps are biased and can be extended or retracted from the body 50 to increase or decrease friction between the die cap 48 and the end closure 16.

The die cap 48 is interconnected to a holder 26 by an axle (not illustrated) retained in a bore 52. During orientation of an end closure 16, the die cap 48 can rotate around the bore 52. After the end closure 16 is oriented, the die cap 48 can lock the axle to prevent unintended or inadvertent rotation of the die cap 48 to keep the end closure 16 oriented. The die cap 48 has a generally flat face portion 54 that is generally perpendicular to a longitudinal axis of the body 50. One or more apertures 56 are formed in the face portion 54. The apertures 56 are interconnected to a vacuum pump and are operable to apply a suction force to an interior surface of the end closure to prevent movement of the end closure 14. Another aperture 56A is interconnected to a tank of compressed air. To release the end closure 14 from the die cap 48, a flow of air is released from the tank through the aperture 56A to blow the end closure 14 off of the die cap 48. Additionally, a pivoting clamp 58 may be positioned on the body 50. The clamp 58 is illustrated in an engaged position in which end 60 applies a force to a circumferential surface of an end closure (not illustrated) to prevent unintended rotation of the end closure 14 on the die cap 48. The clamp 58 can pivot to a disengaged position such that the end 60 does not contact the end closure 14. In one embodiment, the clamp 58 comprises three clamps 58 spaced around the circumference of the body 50. In this embodiment, each clamp 58 can be moved to an engaged or disengaged position independently.

Figure 3:
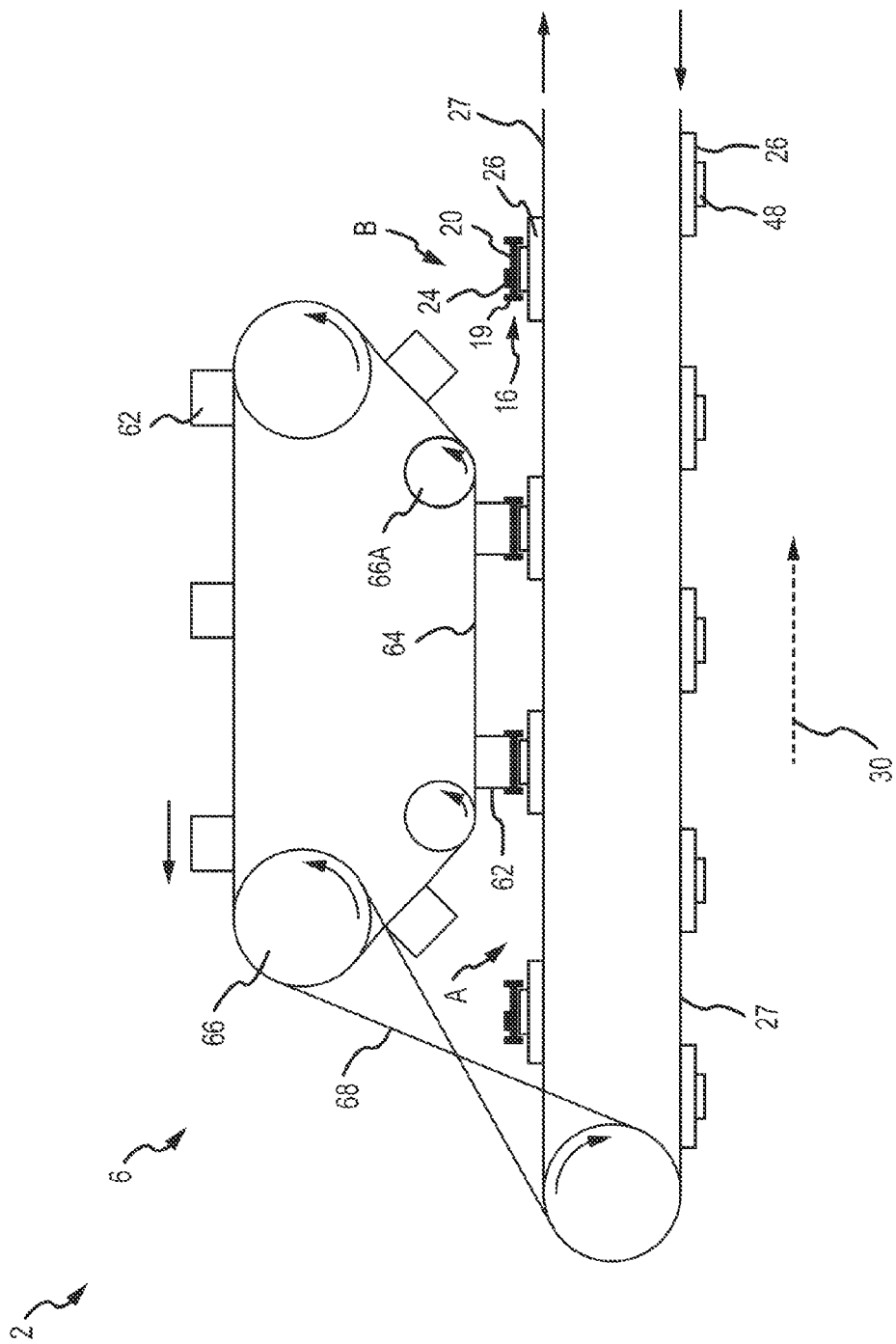
FIG. 3 is a side elevation view of the system of FIG. 1 illustrating an end closure orientation assembly in one embodiment of the present invention.

Referring now to FIG. 3, one embodiment of the orientor 6 is illustrated. The orientor 6 includes orientation heads 62 that are brought into rotational contact with an exterior surface of the unoriented end closures 16. In one embodiment, the orientation heads 62 are interconnected to a belt or chain 64 that is flexible. In one embodiment, the chain 64 is positioned above the path of the holders 26 through the system 2. The orientation heads 62 are spaced on the chain 64 to match the spacing of the holders 26. The orientor 6 includes a sufficient number or orientation heads 62 to contact each end closure 16 positioned in each holder 26. The chain 64 forms a continuous loop around wheels 66. The movement of the orientation heads 62 on the chain 64 is synchronized by a belt or chain 68 operably interconnected to the chain 27 to which the holders are attached such that the orientation heads 62 move at the same rate through the system 2 as the holders 26. As the chain 64 rotates, the orientation heads 62 are lowered into contact with the end closures 16 that are randomly oriented at point A.

As the holders 26 move the end closures 16 through the orientor 6, the orientation heads 62 rotate the end closures 16 to a preferred orientation with respect to the reference axis 30 as discussed in conjunction with FIGS. 5A-5C, below. The orientation heads 62 have a geometry adapted to locate and engage an exterior surface feature of the end closures 16. In one embodiment, the exterior surface feature is a pull tab 24 interconnected to an exterior surface of the central panel 20. In another embodiment, the exterior surface feature is a tear panel 22 of the central panel 20. In still another embodiment, the exterior surface feature is the central panel 20. In yet another embodiment, the exterior surface feature is a rivet that interconnects the pull tab 24 to the central panel 20. In still another embodiment, the exterior surface feature is a debossed area formed in the central panel 20. In another embodiment, the exterior surface feature is a score formed on the end closure 16. When the holders 26 exit the orientor near point B, the end closures 16 are aligned at the preferred orientation.

Although FIG. 3 illustrates an embodiment of the present invention in which the orientation heads are lowered into contact with the unoriented end closures 16, it will be appreciated by one of skill in the art that other methods of bringing the orientation heads 62 into contact with the end closures may be used with the present invention. In one embodiment, the orientation heads 62 are positioned on a lever that moves the orientation heads 62 into contact with the unoriented end closures 16. After the end closures are oriented, the lever moves the orientation heads 62 off of the oriented end closures 16.

It should be understood that although only one orientor 6 is illustrated in FIG. 3, any number of orientors 6 may be used in parallel in the system 2 of the present invention. For example, in one embodiment illustrated in FIG. 1, the system 2 has four orientors 6. In another embodiment, the system 2 has six orientors 6.

Figure 4:
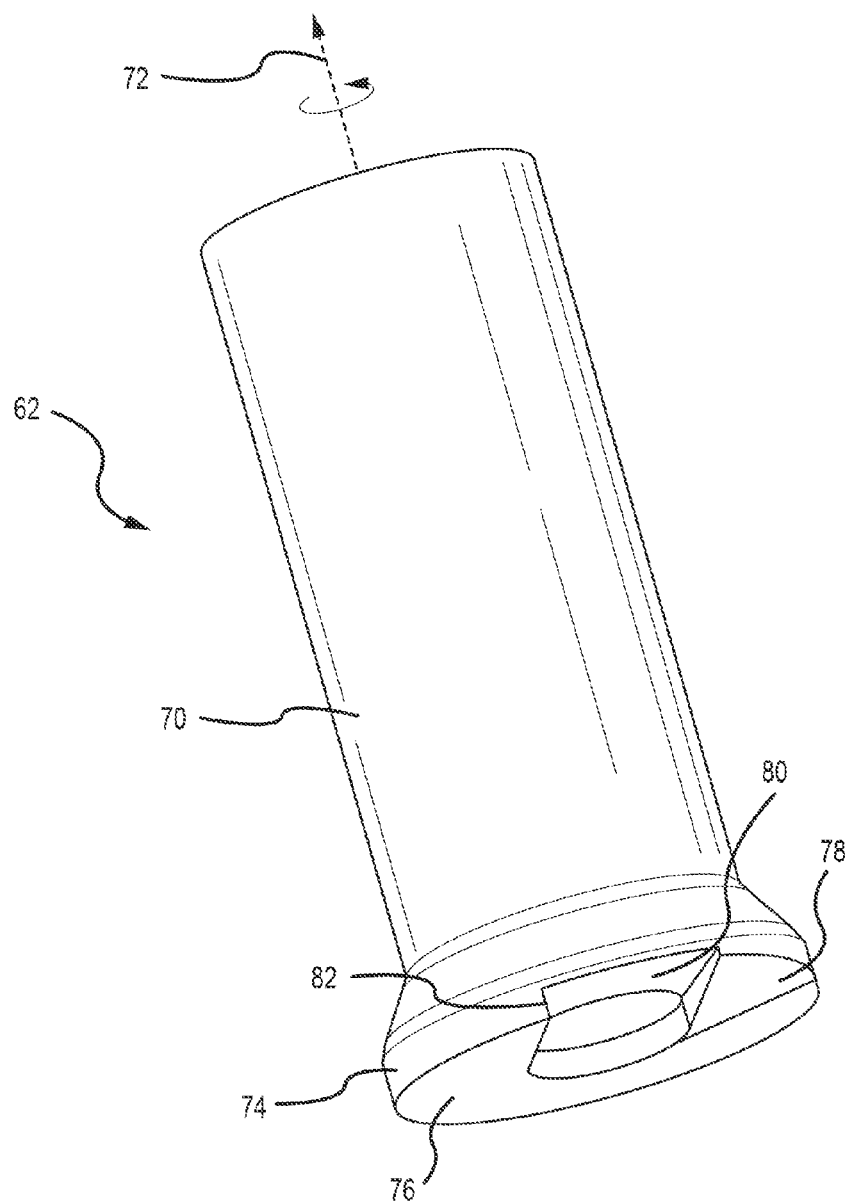
FIG. 4 is a perspective view of an orientation head of one embodiment of the present invention.

Referring now to FIG. 4, an embodiment of an orientation head 62 adapted to orient an end closure 16 is illustrated. The orientation head 62 has a body 70 that is interconnected to the chain 64 of the orientor 6. In one embodiment, the body 70 has a generally cylindrical shape. The body 70 has a head 74 at an end distal from the chain 64. In one embodiment, the head 74 has a diameter greater than the diameter of the body 70. In another embodiment, the head 74 has the same diameter as the body 70. In yet another embodiment, the head 74 has a diameter that is less than the diameter of the body 70. The head 74 has a face portion 76 that is generally perpendicular to a longitudinal axis 72 of the body 70. The face portion 76 is adapted to allow an exterior surface of a pull tab 24 of an end closure 16 to slide along the face portion 76 as the orientation head 62 rotates without applying a rotational force to the pull tab 24. A feature is formed on the face portion 76 that captures and rotates a tab 24 and rotates the end closure 16 to a predetermined orientation. More specifically, the feature has a tapered portion 78 that slopes into the face portion 76 toward the body 70 and forms a first side of a pocket 80. The tapered portion 78 is adapted to enable the tab 24 to slide into the pocket 80. The pocket 80 is adapted to receive the pull tab 24 as the orientation head 62 is rotated about the longitudinal axis 72. A wall 82 extends substantially vertically upward from the pocket 80 to the face portion 76 and forms a second side of the pocket 80. The wall 82 is adapted to engage and apply a force to a side surface of the pull tab 24. In one embodiment, illustrated in FIGS. 5A and 5B, the face portion 76 has a diameter substantially equal to a diameter of the central panel 20 of the end closure 16. In another embodiment, not illustrated, the face portion 76 has a diameter substantially equal to a diameter of the end closure 16.

Referring now to FIGS. 5A-5C, an end closure 16 is rotated into a preferred orientation by an orientation head 62 in a number of successive operations. As shown in FIG. 5A, the end closure 16 is positioned on a die cap 48 with a pull tab 24 facing away from the die cap. A Y-axis 28 of the end closure 16 is positioned at a random angle with respect to a reference axis 30. The end closure 16 is moved to a position where a vertical axis of the end closure is substantially co-linear with a longitudinal axis 72 of an orientation head 62.

A face portion 76 of the orientation head 62 is moved into contact with an exterior surface of the pull tab 24, as illustrated in FIG. 5B. A small top force is applied to the end closure 16 by the orientation head 62. Contact between the orientation head 62 and the pull tab 24 is utilized to rotate the Y-axis 28 of end closure 16 into a preferred orientation with respect to the reference axis 30. More specifically, after contacting the end closure 16, the orientation head 62 rotates about the longitudinal axis 72. The orientation head 62 rotates in a direction that allows the pull tab 24 to move from contacting the face portion 76 up into the pocket 80. The face portion 76 of the orientation head 62 slides along the pull tab 24 until the pull tab 24 reaches the tapered portion 78 formed in the face portion 76. The orientation head 62 continues rotating and moves closer to the exterior surface of the central panel 20 as the pull tab 24 slides along the tapered portion 78 and into the pocket 80. As the orientation head 62 continues to rotate, a side surface 25 of the pull tab 24 contacts the wall 82, retaining the pull tab 24 in the pocket 80. The orientation head 62 continues to rotate and the wall 82 applies a force to the side surface 25 of the pull tab 24, rotating the end closure 16 and the die cap 48 simultaneously. The force applied by the orientation head 62 is sufficient to rotate the end closure 16 and the die cap 48 without the pull tab 24 spinning freely on the end closure 16. Although FIG. 5B illustrates the orientation head 62 and the end closure 16 rotating counter-clockwise, the orientation head 62 may rotate clockwise if the position of the tapered portion 78 and the wall 82 are reversed on the face portion 76 of the orientation head 62.

Referring now to FIG. 5C, the orientation head 62 stops rotating after about one rotation around the longitudinal axis 72. Regardless of the starting orientation of the Y-axis 28, one rotation of the orientation head 62 is generally sufficient to rotate the Y-axis 28 of the end closure 16 into a predetermined alignment with the reference axis 30. However, in one embodiment, the orientation head 62 may rotate up to two times around the longitudinal axis 72. In another embodiment, the orientation head 62 may make up to three rotations around the longitudinal axis 72.

When the predetermined number of rotations of the orientation head 62 is complete, the orientation head 62 is moved away from the end closure 16. The Y-axis 28 of the end closure 16 is substantially parallel with the reference axis 30. In one embodiment, an angle between the Y-axis 28 and the reference axis 30 is less than about 5°. In a more preferred embodiment, the angle between the Y-axis 28 and the reference axis 30 is less than about 2°. In a still more preferred embodiment, the angle between the Y-axis 28 and the reference axis 30 is less than about 1°.

In one embodiment, as the orientation head 62 rotates, the end closure 16 spins freely on the die cap 48 while the die cap remains stationary. In another embodiment, the die cap 48 rotates the end closure 16 while the orientation head 62 remains substantially stationary. In this embodiment, the wall 82 of the orientation head 62 is aligned substantially parallel to the reference axis 30. When the side surface 25 of the pull tab 24 contacts the wall 82, the end closure 16 stops rotating and spins freely on the die cap.

After the end closure 16 is rotated to a predetermined orientation, the holders 26 are operable to prevent further rotation of the end closures 16 by any means known to those of skill in the art. In one embodiment, a clamping mechanism 32 interconnected to the holder 26, illustrated in FIG. 1, applies a force to the end closure 16 to prevent unintended rotation of the end closure 16. In one embodiment, the clamping mechanism 32 comprises a single bar that is moved into contact with all of the end closures 16 in the holder 26. In another embodiment, the holders 26 include a matching contour friction clamp 32 or a multipoint circumferential contact clamp 32 to prevent unintended movement of the end closures 14. In another embodiment, the holders 26 apply a suction force to a surface of the end closure to prevent unintended rotation of the end closures 14. Optionally, a clamp 58 with a pressure applying end 60 may be interconnected to the die cap 48 to prevent rotation of the end closure 16 after the Y-axis 28 is positioned substantially parallel to the reference axis 30. The end 60 is adapted to contact and apply enough force to the end closure 16 to prevent rotation of the end closure 16. In one embodiment, the end 60 moves to apply force to the end closure 16 before the orientation head 62 is moved from contact with the end closure. In another embodiment, a suction force is applied to an interior surface of the end closure 16 through an aperture 56 in the die cap 48 to prevent further rotation of the end closure 16 after the Y-axis 28 is aligned with the reference axis 30.

Referring again to FIG. 1, the Y-axis 28 of all the end closures 16 are substantially parallel to each other when the holder 26 exits the orientor 6 at point B. In one embodiment, the orientor 6 rotates each end closure 16 until the Y-axis 28 is substantially parallel to the reference axis 30 of the system 2 and the tear panel 22 is positioned to the right of the pull tab 24, as viewed in FIG. 1. Although the reference axis 30 is generally horizontal as seen in FIG. 1, it will be appreciated that the reference axis can be aligned at any desired angle. For example, in one embodiment of the present invention, the reference axis is rotated 180° and all of the end closures 16 are oriented with their pull tabs 24 exiting the orientor 6 before the tear panels 22. In another embodiment, the reference axis is rotated 90° clockwise and all of the end closures 16 exit the orientor 6 with the pull-tab 24 oriented towards the top of FIG. 1. In yet another embodiment, the reference axis is rotated 90° counter-clockwise and all of the end closures 16 exit the orientor 6 with the pull-tab 24 oriented towards the bottom of FIG. 1. The orientation of the reference axis 30 may be selected by an operator and may be adjusted to any desired angle.

After the end closures 16 are aligned into an oriented position by the orientor 6, a clamping mechanism 32 prevents inadvertent and unintended movement of the end closures 16 as they are transported through the system 2 by the holders 26.

Maintaining the orientation of the end closures is necessary to add decorations to the desired locations on the end closures 16. If the end closures are allowed to rotate out of the desired oriented position, any decorations may be applied to undesired areas, such as on the pull tab or on scored areas. The clamping mechanism 32 may be actuated by a cam mechanism positioned in the path of the holders 26 through the system 2.

In one embodiment, the clamping mechanism 32 is interconnected to the holder 26 and contacts and applies a force to a side surface of the oriented end closure 16. The clamping mechanism 32 can include a pivoting arm, a fastener, a gripping device, a rod, a bar, a hold, a pneumatic device that creates suction, and/or combinations thereof or any other means known by those of skill in the art to prevent inadvertent and unintended movement or rotation of the end closures 16. In one embodiment, the clamping mechanism 32 prevents movement of the oriented end closures 16 by applying a force to an inside panel wall or an outside curl diameter. In another embodiment, the clamping mechanism 32 physically engages a portion of the oriented end closures to maintain the preferred orientation.

In one embodiment, the clamping mechanism 32 is similar to the clamp 58 illustrated in FIG. 2. The clamping mechanism can include an end similar to the end 60 that rotates to contact and apply pressure to a surface of the end closures 16. In one embodiment, the clamping mechanism 32 applies pressure to a side surface of the end closures 16. In another embodiment, the clamping mechanism 32 applies pressure to a top surface of the end closures. In yet another embodiment, the clamping mechanism 32 applies pressure to an outer circumference of the end closures 16. The pivot point of the clamping mechanism 32 can be moved to increase the force applied by the end. In one embodiment, the end has an arcuate shape with a radius of curvature approximately equal to a radius of curvature of an exterior surface of an end closure 16.

The holders 26 with the oriented end closures 16 next enter the coater 8. Optionally, the coater 8 can pre-treat the exterior surface of the end closures 16. In one embodiment, the pre-treatment is a corona surface treatment, or air plasma treatment, that uses a low temperature corona discharge plasma to change the surface properties of the end closures 16. In another embodiment, one or more of a corona surface treatment, flame plasma treatment, chemical plasma treatment, electroplating, electrostatic plating, chemical coating, anodic oxidation, hot dipping, and thermal spraying may be performed to pre-treat the exterior surface of the end closures 16. The pretreatment generally improves adhesion and bonding between a base coating applied by the coater 8 and the exterior surface of the end closure 16.

The coater 8 applies a base coating material to the exterior surface of the end closures 16. The base coating material generally improves the appearance of colored inks that are applied by the printer 10. The base coating material may be an ink, adhesive, or lacquer of any desired color. In one embodiment, the base coating material is a photosensitive compound that can be cured with ultra violet light. In one embodiment, a white base case coating material is applied to the end closures 16. In another embodiment, a clear base coating material is applied to the end closures 16. However, as will be understood by one of skill in the art, base coatings of any desired color may be applied by the coater 8. Additionally, more than one coating can be applied to the end closures. For example, in one embodiment, the system 2 includes two or more coaters 8 that each apply a different base coating or a base coating of a different color.

The coater 8 includes a drum 34 that is positioned above the path of the holders 26 through the system 2. The drum 34 can rotate about an axis that is substantially perpendicular to the reference axis 30 of the system 2. The drum 34 has radial section that matches the pitch or frequency of the holders 26 moving through the system 2.

Offset printing blankets 36 are attached in rows 37 that run around an exterior circumference of the drum 34. The number of rows 37 of blankets is equal to the number of end closures 16 in each holder 26. Printing blankets of any size, thickness, or material may be used. If necessary, the printing blankets 36 may be cut to fit the end closures. The number and positions of the printing blankets 36 can be altered depending on the size of the end closures 16 and the number of end closures in each holder 26. In one embodiment, the printing blankets 36 have an adhesive backing that is used to interconnect the blankets 36 to the drum 34. However, it will be understood that any suitable means may be used to interconnect the blankets 36 to the drum.

The diameter of the drum 34 can be increased or decreased to match the pitch of the holders 26 and to adjust the quality and amount of coating applied by the coater 8. For example, if the distance between each holder 26 is increased, the diameter of the drum 34 can be increased to ensure proper alignment between the printing blankets and the end closures 16. The drum 34 rotates at a rate determined to match the frequency or pitch of the holders 26 moving through the system. In one embodiment, the drum 34 has a gear 35 to engage the chain 27 to control the drum's rate of rotation. The drum 34 is synchronized so that the gear 35 engages the chain 27 to initiate contact with the end closures 16 at a fixed location. The gear 35 sets the application of the coating in a controlled location on the end closures 16 and ensure runtime phenomena such as stretching of the chain 27 do not degrade the quality of the coating or improper placement of the coating. The synchronization of the coater 8 and the holders 26 is monitored and may be corrected by a computer. In one embodiment, when the computer detects an end closure is not properly seated in the holder 26 or that a holder 26 is not synchronized with the coater 8, the computer can raise the drum 34 of the coater 8 to prevent contact between the blankets 36 and end closures 16. The end closures will then pass through the system 2 without receiving coatings and decorations and will be rejected when they reach the inspection station 45 and separated from properly decorated end closures.

Because the central panel 20 is generally recessed and is lower than the peripheral curl 19, as illustrated in FIG. 3, the printing blankets 36 generally protrude from a circumference of the drum 34. The printing blankets 36 generally only contact portions of the end closures 16 that require coatings. To prevent contact between the printing blankets 36 and portions of the end closures 16 that will not be decorated, recesses 38 may be formed in the printing blankets 36. In one embodiment, the recesses 38 are sized to align with the pull tabs 24 and prevent contact between the pull tabs 24 and the blankets 36 during the application of coatings. The size and shape of the recesses 38 can be adjusted for various features such as larger pull tabs, vents, or other features on the exterior surface of the end closures. Optionally, the recesses 38 can include a shape corresponding to the shape of the tear panels 22 as illustrated in FIG. 1. However, it should be understood that the printing blankets can include areas that contact and apply coatings to the tear panels 22 and to the pull tabs 24. Although only one recess 38 is illustrated in each printing blanket 36, it will be understood that more than one recess may be formed in each printing blanket 36. Further, one of skill in the art will recognize that the size and shape of the printing blankets 36 and recess 38 can be tuned or adjusted to apply coatings only in one or more predetermined areas of each end closure.

As the holders 26 with the oriented end closures 16 move through the coater 8, the drum 34 rotates about an axis substantially perpendicular to the reference axis 30. The base coating material is applied to each printing blanket 36 by an application roller 40. The application roller 40 is operable to transfer the base coating to predetermined portions of each printing blanket 36. The location, size, shape, and amount of base coating transferred to each printing blanket 36 can be adjusted to conserve the base coating material and to match the decoration that will be applied to the end closure by the printer 10.

After receiving the base coating material from the application roller 40, the drum 34 continues to rotate and brings each printing blanket 36 into contact with an end closure. The printing blankets 36 protrude at least partially into the end closures 16 and make contact with a predetermined portion of the exterior surface of the end closures 16. The height of the drum 34 above the holders 26 can be adjusted higher or lower to increase or decrease the amount of pressure the printing blankets 36 apply to the end closures 16.

The holder 26 continues to a curer 12 that cures the base coating with an ultra violet light source. However, the curer 12 may also cure the base coating using any method known to those skilled in the art, including thermal curing and infra-red curing. In one embodiment, the ultra violet light of the curer 12 is produced by light emitting diodes (LEDs). In another embodiment, the ultra violet light is produced by mercury-vapor lamps.

Next, the holders 26 transport the end closures 16 to the printer 10. The printer includes a drum 34A that is the same as or similar to the drum 34 of the coater 8. The drum 34A is positioned above the path of the holders 26 and rotates above an axis substantially perpendicular to the reference axis 30 of the system 2. The diameter of the drum can be increased or decreased to match the pitch of holders 26 moving through the system 2.

Printing blankets 36A are attached in rows 37 to an exterior circumference of the drum 34A and protrude from the surface of the drum 34A. The printing blankets 36A can be of any size, shape, or thickness and can include one or more recesses 38A as discussed above. The recesses 38A can have the same size and shape of the recesses 38 attached to the drum 34 of the coater 8. Optionally, the printing blankets 36A can have a different shape than the printing blankets 36. The distance between the holders 26 and the drum 34A can be adjusted to increase or decrease the pressure the blankets 36A apply to each end closure 16.

As the drum 34A rotates, each printing blanket 36A contacts up to six different print heads 42. Images are formed on predetermined portions of each print head 42. Each print head 42 may have a different image, or portion of an image, formed thereon. Additionally, each print head 42 may have images formed in rows that correspond to the rows 37 of the drum 34A. In this manner, the print heads 42 may transfer different images to each row 37 of printing blankets 36A attached to the drum 34A.

Inkers 44 transfer ink to the print heads 42. Each inker 44 applies a single color of ink to the image of each print head 42. As the drum 34A rotates, each of the print heads 42 contacts a printing blanket 36A and transfers its image and particular color of ink to the printing blanket. The recesses 38A do not receive ink. When all of the print heads 42 have transferred their ink colors and images to the printing blankets 36A, a final lithographic image is formed on the printing blankets 36A. The printing blankets 36A then continue to rotate until they contact and transfer the lithographic image to the predetermined portion of the exterior surface of the end closures 16. The recess 38A formed in the printing blanket 36A prevent contact between printing blanket 36A and portions of the end closures 16 that will not be decorated. In one embodiment, the recess 38A has a shape that prevents contact between the printing blanket 36A and the pull tab 24 and other features and structures of the end closure 16 that will not be decorated. In another embodiment, the recess 38A has a shape that prevents contract between the printing blanket 36A and a first portion of the pull tab 24 and the printing blanket 36A transfers the lithographic image to a second portion of the pull tab 24.

The method of offset printing can be varied to use any number of colors. As will be appreciated by one of skill in the art, any type of ink may used with the present invention. In one embodiment, the inks are UV curable. In another embodiment, the inks are powders or pastes.

Any method may be used to form the images on the print heads 42 and the printing blankets 36A to form a high resolution lithographic image for transfer to the end closures. Optionally, one or more printing blankets 36A interconnected to the drum 34A of the printer 10 may have a different image formed thereon to transfer a different image to the end closures. For example, in one embodiment, the image formed on the printing blankets of row 37A may be different than the image formed on the printing blankets of row 37D. Further, the printing blankets 36A in row 37A may have a different recess 38A than the printing blankets in row 37D. In addition, the printing blankets 36A may be comprised of soft photopolymer plates with images formed thereon, as described in U.S. patent application Ser. No. 14/301,018, which is incorporated herein by reference in its entirety. Optionally, an image may also be formed on each printing blanket 36A. For example, the printing blankets 36A may include etched or engraved portions that do not receive ink to form multiple images from a single set of printing blankets, as described in International Patent Publication No. WO 2014/008544, which is herein incorporated by reference in its entirety.

The holder 26 next enters a second curer 12A that is operable to cure the decoration applied to the end closures 16. The second curer 12A uses an ultra violet light source to cure the inks of the decoration. Optionally, the second curer 12A may use a heat source to cure the decoration as will be appreciated by one of skill in the art.

Optionally, an overcoat material may be applied by a second coater 8A. The second coater 8A is the same as or similar to the coater 8 described above. The overcoat material is used to enhance the appearance of the decoration applied to the end closure 16 and to protect the decoration from the environment and from contact with other objects. The overcoat material is applied by the second coater 8A in the same manner as the base coat material. In one embodiment, the overcoat material is a clear coating. Optionally, the second coater 8A may be a second printer 10A. The second printer 10A can apply a second decoration to the end closures 16 or apply different coatings and colors to the decoration applied by the first printer 10. If the optional overcoat material or a second decoration are applied, the coating or decoration is cured in a third curer 12B using an ultra violet light source or a heat source.

The holders 26 may optionally transport the decorated end closures 16 to an inspection station 45 to ensure the decoration has been applied to the intended location of the end closures 16. The inspection station 45 can also determine if the decoration meets a predetermined quality. In one embodiment, the inspection station 45 includes a camera for each end closure 16 positioned in the holder 26. However, it will be understood by those of skill in the art that the inspection station may include any means known by those of skill in the art to ensure the location and the quality of the decoration meet or exceed predetermined quality criteria. End closures that pass the inspection are separated from the end closures that do not pass the inspection and are collected separately.

After the holders 26 exit the curer 12A or 12B at point C, the end closures 16 are transferred to the collector 14 where each decorated end closure is bagged and prepared for shipment to a bottler or for storage. A blast of air may be directed through an aperture 56 of the die cap 48 to move the end closures 16 to the collector 14. In one embodiment, as the chain 27 reaches point C, the chain 27 rotates around a roller. The holders 26 rotate out of a generally horizontal position and the end closures fall out of the holders 26.

When the end closures 16 are removed from the holders 26 at point C, the holders 26 cycle back to receive another group of unoriented end closures 16 from the balancer 4 at point A. The end closures 16 remain in the holders 26 as the holders move from the balancer 4 until the end closures are removed at the collector 14.

Optionally, the system may include a mandrel and tools for embossing, debossing, and/or engraving the exterior surface of the end closures 16. In one embodiment, the tools comprise rollers with contact surfaces with a shape predetermined to form a raised or embossed profile or indicia onto one or more portions of the end closures 16. The system 2 may further comprise tools, such as an abrasive tool, polisher, or grinder, to selectively remove coatings and/or ink from a predetermined exterior surface portion of the embossed profile formed on the end closure 16 to produce an end closure 16 with a bare metal embossed decoration. Optionally, the bare metal embossed decoration can be decorated with coatings by the coater 8, printer 10, and/or the second coater 8A. In one embodiment, the embossing tools of the system 2 form an embossed profile or indicia on the end closures 16 before coatings or decorations are applied to the end closures 16.

An example of a decorated end closure 16B is also illustrated in FIG. 1. The end closure 16B includes a first image 46A positioned in a predetermined portion of the central panel 20. A second image 46B of an arrow points toward the secondary vent 23 formed on the central panel 20. A third image 46C of a recycle indicator is formed on the tear panel 22. Because the end closure 16B was oriented by the orientor 6 before being decorated, the images 46 are located in predetermined areas of the end closure 16B that are not obstructed by the pull tab 24, the secondary vent 23, or other structures of the end closure. It will be appreciated that images 46 may be formed at any location on the end closure, including the tear panel 22 and the pull tab 24. Further, the images 46 may include text, customer identification information, branding information, directions of use (for example, the arrow 46B) or any other desired decoration or indicia.

The system 2 can orient and decorate approximately 2,000 end closures at 16 per minute. In one embodiment, the system can orient and decorate approximately 1,000,000 end closures in 8 hours. The printer 10 can form images 46 using up to six different colors of ink with a resolution of 133 lines per inch.

Referring now to FIG. 6, an embodiment of a method 84 for orienting and decorating end closures 16 is illustrated. While a general order of the method 84 is shown in FIG. 6, the method 84 can include more or fewer steps, or can arrange the order of the steps differently than those shown in FIG. 6. Generally, the method 84 starts with a start operation 86 and ends with an end operation 110. Hereinafter, the method 84 shall be explained with reference to the apparatus 2 described in conjunction with FIGS. 1-5.

A balancer 4 loads 88 converted end closures 16 into a holder 26. Optionally, the end closures 16 can be positioned on a die cap 48. The holder 26 transports the end closures 16 into an orientor 6. The orientor 6 rotates 90 the end closures 16 to a predetermined orientation. The end closures 16 are locked 92 in the predetermined orientation by a clamping mechanism 32. Optionally, a clamp 58 interconnected to the die cap 48 may lock the end closures 16 in the predetermined orientation. Additionally, the end closures 16 may be locked in the predetermined orientation by a suction force applied through an aperture 56 of the die cap 48.

The end closures 16 are inspected 94 to determine if the end closures 16 are in the predetermined orientation. If the end closures 16 are not in the predetermined orientation, method 84 proceeds NO and the rejected end closures 16 are collected 106. If the end closures 16 are in the predetermined orientation, method 84 proceeds YES and the end closures 16 are optionally pre-treated 96.

The holder 26 transports the end closures 16 to a coater 8 and a curer 12 that are operable to apply and cure 98 base coatings to predetermined areas of the end closures 16. The holder 26 then transports 100 the end closures 16 to a printer 10 and a second curer 12A. The printer 10 is operable to apply a decoration to one or more predetermined areas of the end closures 16. Optionally, the decorator can apply different decorations to each of the end closures positioned in the holder 26. The second curer 12A is operable to cure the decoration applied to the end closures 16 by the printer 10. Optionally, an over coating may be applied 102 to the end closures 16 by a second coater 8A and cured by a third curer 12B.

The end closures 16 are then inspected 104 to ensure the decoration is in a proper location and quality. If the end closures 16 do not pass the inspection 104, the method 84 proceeds NO and the rejected end closures 16 are collected 106. If the end closures 16 pass the inspection 104, the method 84 proceeds YES and the end closures are collected 108 by the collector 14. The method 84 then ends 110.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. A method of orienting and decorating an end closure for a beverage container, comprising:
   providing an end closure comprising a peripheral curl, a chuck wall extending downwardly from the peripheral curl, a countersink interconnected to a lower end of the chuck wall, a central panel interconnected to the countersink, a tear panel in the central panel, and a pull tab operably interconnected to an exterior surface of the central panel;

placing an orientation head in rotational contact with an exterior surface of the end closure;

rotating said orientation head and the end closure to a predetermined orientation;

securing the end closure in said predetermined orientation;

disengaging said orientation head from the end closure; and decorating a predetermined portion of the exterior surface of the end closure with an image.

2. The method of claim 1, wherein decorating a predetermined portion of the exterior surface of the end closure further comprises:

forming a recess in a printing blanket, wherein said recess is adapted to receive the tab;

removably affixing said printing blanket onto a drum of a coater; applying a base coat material to a predetermined portion of said printing blanket; and transferring the base coat material from said printing blanket to the predetermined portion of the exterior surface of the end closure.

3. The method of claim 1, wherein decorating a predetermined portion of the exterior surface of the end closure further comprises:

forming a recess in a printing blanket, wherein said recess is adapted to receive the tab;

removably affixing said printing blanket onto a drum of a printer;

forming said image on a print head;

applying ink to said image;

transferring the ink from said print head to a predetermined portion of said printing blanket; and transferring the ink from said printing blanket to the predetermined portion of the exterior surface of the end closure.

4. The method of claim 3, wherein said print head comprises six print heads, and wherein each print head receives a different color or type of ink.

5. The method of claim 3, further comprising removably affixing a plurality of additional printing blankets with recesses to said drum of said printer, wherein the plurality of additional printing blankets are removably affixed to a circumference of said drum of said printer, and wherein a plurality of end closures can be decorated simultaneously.

6. The method of claim 1, further comprising placing the end closure on a die cap, said die cap operable to selectively prevent rotation and movement of the end closure.

7. The method of claim 1, wherein rotating the end closure to said predetermined orientation further comprises rotating the end closure until a Y-axis of the end closure is substantially parallel to a reference axis.

8. The method of claim 7, wherein an angle between the Y-axis and said reference axis is less than about 5°.

9. The method of claim 1, wherein said orientation head comprises a body portion, a face portion, a pocket formed in said face portion to receive the pull tab of the end closure, a tapered portion extending from said face portion to a bottom of said pocket, and a wall extending from said bottom of said pocket substantially vertically to said face portion, and wherein when the orientation head is rotated the pull tab slides into said pocket and is retained in said pocket by said wall.

10. The method of claim 1, wherein decorating the predetermined portion of the exterior surface of the end closure comprises decorating at least one of the central panel, the tear panel, and the pull tab.

11. An apparatus for orienting and decorating an exterior surface of an end closure which is adapted for interconnection to a neck of a beverage container, comprising:

an orientor including an orientation head, said orientor operable to receive a holder with an end closure, said orientation head having a geometry adapted to locate and engage a pull tab interconnected to an exterior surface of the end closure and rotate the end closure to a predetermined orientation, wherein said holder prevents rotation of the end closure from the predetermined orientation; and a printer operable to transfer an image to a predetermined portion of the end closure.

12. The apparatus of claim 11, further comprising:

a balancer operable to receive the end closure and place the end closure in the holder, the holder operable to move the end closure through the apparatus and selectively prevent rotation of the end closure;

a coater operable to apply a base coat material to the predetermined portion of the exterior surface of the end closure; and at least one curer operable to cure the base coat material and the image.

13. The apparatus of claim 11, wherein the orientation head comprises a body portion, a face portion, a pocket formed in said face portion to receive the pull tab of the end closure, a tapered portion extending from said face portion to a bottom of said pocket, and a wall extending from said bottom of said pocket substantially vertically to said face portion, and wherein the orientation head is operable to rotate around a longitudinal axis of said body portion.

14. The apparatus of claim 11, wherein the printer further comprises:

at least one print head with the image formed thereon;

an inker operable to transfer ink to the image on said print head; and a drum, said drum having a circumference with one or more printing blankets affixed thereto, said printing blankets each having a recess adapted to receive the pull tab interconnected to the exterior surface of the end closure, said drum operable to move said printing blankets into rotational contact with said print head and the exterior surface of the end closure, wherein the image is transferred from said print head to said printing blankets and then to the predetermined portion of the end closure.

15. The apparatus of claim 11, wherein the holder includes a clamp that applies pressure to the end closure to hold the end closure in the predetermined orientation.

16. The apparatus of claim 11, wherein the apparatus is operable to orient and decorate from 1 to 5 end closures simultaneously.

* * * * *